(12) United States Patent
Yount et al.

(10) Patent No.: US 6,366,837 B1
(45) Date of Patent: Apr. 2, 2002

(54) METHOD FOR PROVIDING COMMAND AUGMENTATION TO A COMMAND LANE WITHIN A VEHICLE

(75) Inventors: Larry Yount, Scottsdale; John Todd, Glendale, both of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/616,934

(22) Filed: Jul. 14, 2000

(51) Int. Cl.$^7$ ................................................ G05D 1/00
(52) U.S. Cl. .......................... 701/4; 701/11; 244/75 R; 244/196; 340/967
(58) Field of Search ................................ 701/4, 11, 14, 701/15, 16; 244/17.13, 75 R, 196; 73/178 R, 178 T; 340/945, 967

(56) References Cited

U.S. PATENT DOCUMENTS

| | | | |
|---|---|---|---|
| 4,109,886 A | * 8/1978 | Tribken et al. ............. 244/178 |
| 4,460,964 A | * 7/1984 | Skutecki et al. ............ 364/434 |
| 4,567,813 A | 2/1986 | Garnjost ...................... 91/363 |
| 4,807,516 A | 2/1989 | Takats .......................... 91/363 |
| 4,887,214 A | 12/1989 | Takats et al. .......... 364/424.01 |
| 5,036,469 A | 7/1991 | Pelton ........................ 364/428 |
| 5,374,014 A | 12/1994 | Traverse et al. ............. 244/227 |
| 5,670,856 A | 9/1997 | Lee et al. .................... 318/564 |
| 5,806,805 A | 9/1998 | Elbert et al. ................. 244/195 |
| 5,833,177 A | * 11/1998 | Gast ........................... 244/195 |

* cited by examiner

Primary Examiner—Yonel Beaulieu

(57) ABSTRACT

A method augmenting a pilot's command lane signal by transmitting the pilot's input command to a first summer and the surface actuator control circuitry. The first summer output signal is transmitted to a second summer circuit to add (or subtract) the first summer output signal with a flight control signal resulting in a second summer output signal. The second summer output signal is transmitted to the first summer to add, subtract or otherwise modify the second summer output signal with the pilot command input signal. Thus, the pilot command input signal is augmented or coupled with the second summer output signal to provide better control of the aircraft while not allowing the flight control computer/avionics control electronic circuitry to directly augment the pilot command input signal.

17 Claims, 3 Drawing Sheets

METHOD FOR PROVIDING COMMAND AUGMENTATION TO A COMMAND LANE WITHIN A VEHICLE

FIELD OF THE INVENTION

The present invention relates to aircraft electronics, and more particularly to a method for introducing at least one augmentation signal to a pilot's command lane in an aircraft.

BACKGROUND OF THE INVENTION

In recent years, fly-by-wire flight control systems have replaced many mechanical flight control systems on aircraft. While older aircraft incorporated complex mechanical assemblies requiring cables and other mechanical components to transmit pilot commands to the control surfaces, fly-by-wire flight control systems were designed to convert a pilot's commands into electrical signals that, when combined with other data, would be transmitting to aircraft flight surfaces to control such surfaces. In fly-by-wire flight control systems, a pilot's commands are translated into electrical signals through the use of transducers or sensors that sense the pilot's inputs on various mechanical or electrical components. The electrical signals produced by the transducers are fed to a flight control computer or flight computer, along with other data indicative of flight parameters. Based upon the data it receives, the flight computer generates signals designed to achieve the desired flight path commanded by the pilot. A circuit system known as the actuator control electronics ("ACE") receives these electronic signals from the flight control computer and sends command signals to the hydraulic or electro-hydraulic actuators attached to the aircraft's surfaces. Each hydraulic actuator is coupled to a moveable surface such that movement of the actuator moves the primary control surface.

The command path from the pilot's movement of aircraft mechanical or electrical components to the aircraft's surfaces are known as the pilot command lane which includes generally at least one command lane signal between the pilot and each surface. When the pilot communicates directly with each surface, it is known as a direct mode command lane. In the prior art, as illustrated in FIG. 1, the pilot's commands are not allowed to directly control the aircraft for safety reasons, but rather, are transmitted directly into the flight control module and ACE circuit (collectively, the FCM/ACE circuitry) before being sent to the actuator and surface control mechanisms. For example, if the pilot attempts to control the aircraft to execute a nose dive while in flight, the FCM/ACE circuitry detects that this is not a normal aircraft operation and thus prevents the pilot from transmitting such an instruction to the actuator and surface control mechanisms. The FCM/ACE circuitry also directly augments or couples with the pilot's input signals by providing additional commands to the input signal to allow the pilot to more easily control the aircraft, both at high speed, low speed and at any altitude. As an analogy, for example, the FCM/ACE circuitry allows the pilot to operate the aircraft automatically and without much effort (similar to cruise control or automatic transmission on an automobile), but if the FCM/ACE circuitry is disengaged, the aircraft will be much harder to control. While the pilot can manually disengage the FCM/ACE circuitry, such actions are heavily discouraged under current federal regulations and absolutely prohibited if the aircraft is operating normally.

The FCM provides augmentation to the pilot's direct commands by introducing signals to the direct commands which smooth the flight of the aircraft. The FCM ensures a smooth flight by allowing the aircraft to behave identically in different situations.

The FCM provides stability augmentation, configuration augmentation, and thrust augmentation. Stability augmentation is when the FCM makes small adjustments to smooth the flight. For example, the aircraft might not fly straight and smooth due to certain weather conditions. The aircraft may porpoise, in that its pitch and altitude are constantly changing. The FCM can sense this condition and continually send signals to the elevators to counteract those tendencies and ensure a smooth, level flight.

Configuration augmentation allows the aircraft to behave identically, from the pilot's point of view, regardless of the configuration of the aircraft, for example, whether the flaps are in or they are extended. Normally, when the flaps are extended, the lift of the aircraft increases, the pilot must adjust for the increased lift by adjusting the elevators such that the aircraft remains at the same altitude. The pilot of an augmented aircraft need not nose down because the aircraft compensates for the different configuration of the aircraft.

Thrust augmentation automatically adjusts the thrust produced by the engines to maintain a constant speed. For example, less thrust is needed when the aircraft is pitched down than when the aircraft is flying level. This adjustment can be made automatically by the FCM.

During aircraft operation, the pilot of the aircraft may need certain data to assist in flying the aircraft. This data includes air speed, altitude, weather, location, heading and other navigational data. The data is generated by the transducers or sensors which are located in various parts of the aircraft. The systems used to generate and report this and other information management data is generally termed "avionics." The term "avionics" also encompasses auto-pilot functions, which allow a computer to make inputs to the pilot's controls. In modern fly-by-wire aircrafts, the avionics systems may be placed in a cabinet or housing to share, for example, power supplies, processors, memory, operating systems, utility software, hardware, built-in test equipment, and input/output ports. This grouping of avionics is known in the art as integrated modular avionics ("IMA").

The IMA gathers and process data for a number of functions, including, but not limited to, flight management, displays, navigation, central maintenance, aircraft condition monitoring, flight deck communications, thrust management, digital flight data, engine data interface, automatic flight, automatic throttle, and data conversion.

One of the problems associated with the prior art approach is that the FCM/ACE circuitry is required to be set up for similar redundancy or design diversity for safety purposes. In similar redundancy, two computing systems or computing lanes are employed in the aircraft that are similar, but not identical, to each other. This design is highly processor intensive. For example, two computing channels could be used, with each computing channel having a different CPU and different software. In the alternative, the same CPU might be used for each computing path, but different software (for example, developed by a separate group of programmers) would be used. The theory behind similar redundancy is that, if one of the computing lanes makes a mistake, it is unlikely that a second computing lane, performing the same function but in a different manner, would contain the same fault that occurs at the same place.

Such a similar redundancy scheme results in increased development costs, because the same software program must be developed twice. However, the federal aviation regulations only require that full-time critical components have similar redundancy. There is no such requirement for part-time critical components. Thus, the development costs for the software is almost doubled because the software must be developed twice. Furthermore, there is extra weight on the aircraft because of the need for a separate flight control computer with a separate power supply and separate processing capabilities. The separation of the flight control computer results in another disadvantage because of the way a typical flight control computer communicates with the IMA over a standard ARINC 629 bus. The ARINC 629 bus is slower than the bus internal to the IMA. Thus, for the IMA to transmit data to the flight control computer as it is being processed, either less data must be transmitted, or the same data must be transmitted over a longer period of time. Because of the importance of receiving information in a timely manner, prior art designers chose to transmit less data. Therefore, a separate flight control computer does not receive the full flight information generated by the IMA.

Moreover, one of the other disadvantages with the prior art approach is that it places the FCM/ACE circuitry directly in the pilot's command lane. While the software redundancy is useful to significantly reduce the possibility that the prior art FCM/ACE will not interfere with the operation of the aircraft, there is absolutely no assurance that the FMC/ACE circuitry will completely fail. Thus, the prior art approach makes operation of the aircraft potentially unsafe, even if remotely possible. What is needed is a method or system that alleviates or eliminates these problems.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention concerns a method for providing at least one augmented signal with the pilot's command lane signal to achieve better operational stability of the aircraft and increased safety. In one embodiment, the present invention transmits the pilot's input command to a first summer and the surface actuator control circuitry. The first summer output signal is transmitted to a second summer circuit to add (or subtract) the first summer output signal with a flight control signal resulting in a second summer output signal. The second summer output signal is transmitted to the first summer to add (or subtract) the second summer output signal with the pilot command input signal. Thus, the pilot command input signal is augmented or coupled with the second summer output signal to provide better control of the aircraft while not allowing the FCM/ACE circuitry to directly augment the pilot command input signal.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figure further illustrates the present invention and, together with the detailed description of the invention, serve to explain the principles of the present invention.

DETAILED DESCRIPTION OF THE INVENTION

Figure 1:
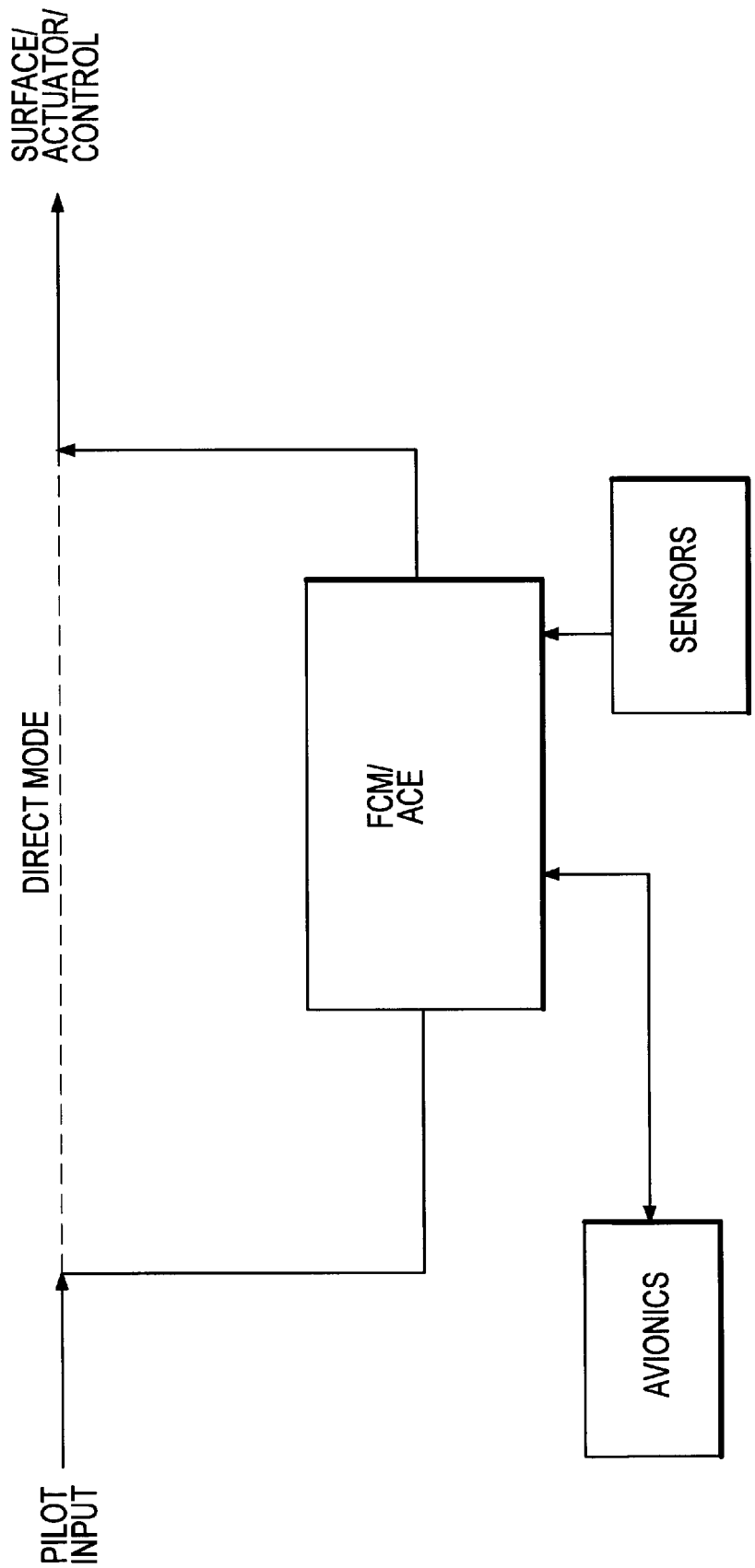
FIG. 1 is a block diagram illustrating a pilot command lane of the prior art.
Figure 2:
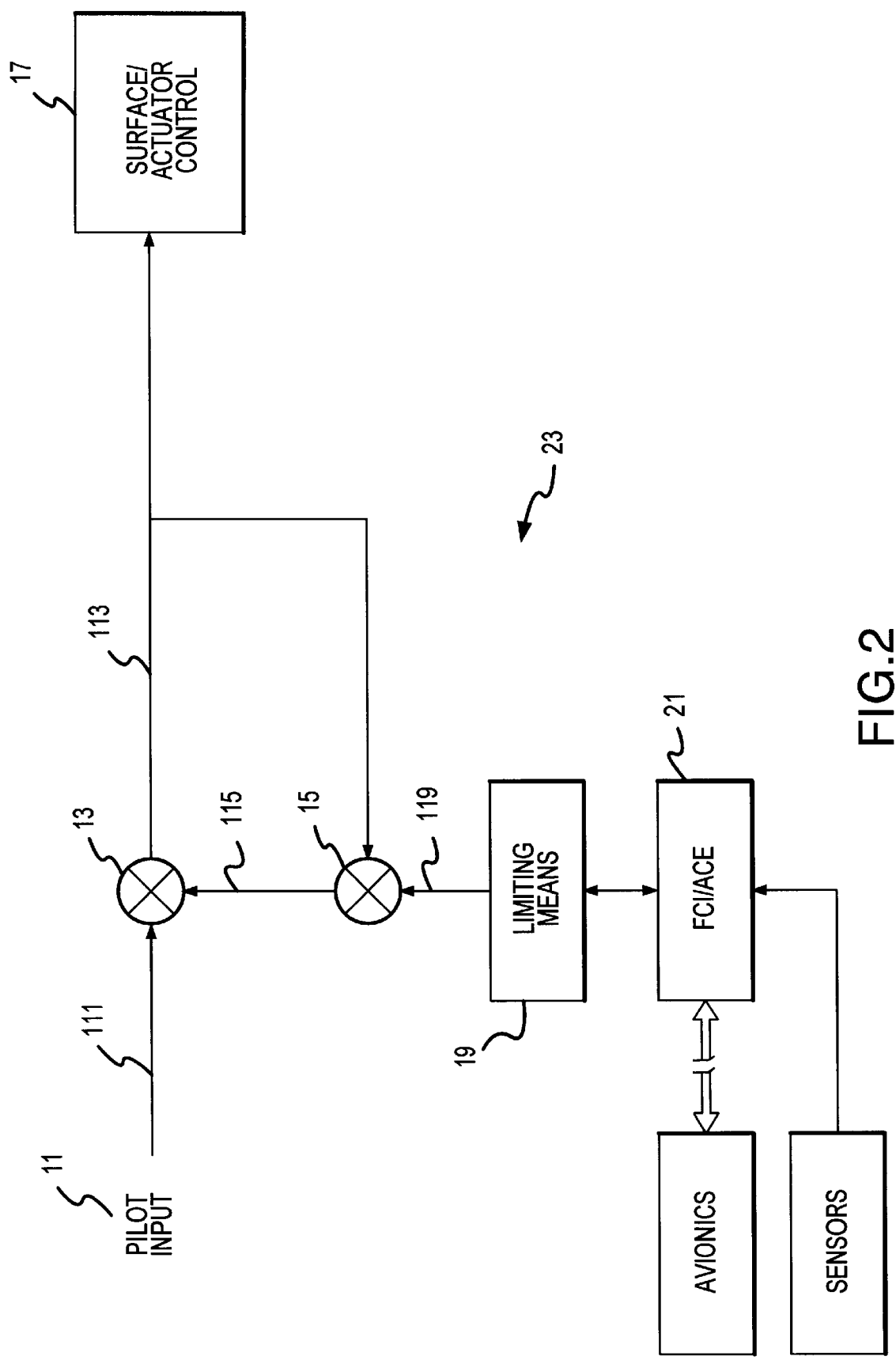
FIG. 2 is a block diagram illustrating a pilot command lane according to one embodiment of the present invention.

As seen in FIG. 2, the present invention is a method for providing at least one command augmentation signal to a pilot command lane within an aircraft which does not incorporate the FCM/ACE circuitry directly into the pilots command lane.

As illustrated in FIG. 2 and in accordance with one embodiment of the present invention identified as the command lane implementation, the pilot's input commands (usually in the form of at least one voltage signal, for example) 111 are transmitted to a first summer circuit 13 or like processor and thereafter, transmitted to the surface actuator control circuitry 17. The first summer output signal 113 is transmitted to a second summer circuit 15 or like processor which adds, subtracts or generally modifies the first summer output signal 113 with a flight control signal 119 resulting in a second summer output signal 115. The second summer output signal 115 is transmitted to the first summer 13 to add, subtract or generally modify the second summer output signal with the pilot command input signal 111. Thus, the pilot command input signal 111 is augmented or coupled with the second summer output signal 115 to provide better control of the aircraft while not allowing the FCM/ACE circuitry to directly augment the pilot command input signal 111. Thus, as the aircraft's sensors detect unstable motion of the aircraft, such information is transmitted to the FCM/ACE circuit 21. The FCM/ACE circuit 21, in turn, transmits a signal 119 with is coupled with the pilot's command signal 111 to either add or subtract a voltage (for example) to the pilot's input command and thus allowing for smooth operation and integrity of the aircraft. In one embodiment, this completes a closed loop control system or command lane 23. Those of skill in the art will now appreciate that the FCM/ACE circuit 21 never affects the pilot command to surface control, and thus, can never cause problems with the aircraft's primary stick to surface control command lane.

Preferably, a limiting means 19 electrically communicates with the FCM/ACE circuitry 21 and the second summer circuit 15. Limiting means 19 is intended to limit the amount of control the IMA, the FCC, the ACE and the pilot can have on the overall flight control system, and thus, the overall operation of the aircraft. Those of skill in the art will realize that the design of the limiting means 19 can be implemented in either hardware or software, and either in digital or analog format. An analog limiting means is the preferred embodiment as it does not require design redundancy like a software implementation. Limiting means 19 limits, without limitation, limits of rate, limits of gain, limits of airspeed, limits of phase margin limits of roll, limits of yaw, limits of pitch, limits of speed break, limits of column position data and like limits required for safe operation of the aircraft.

Figure 3:
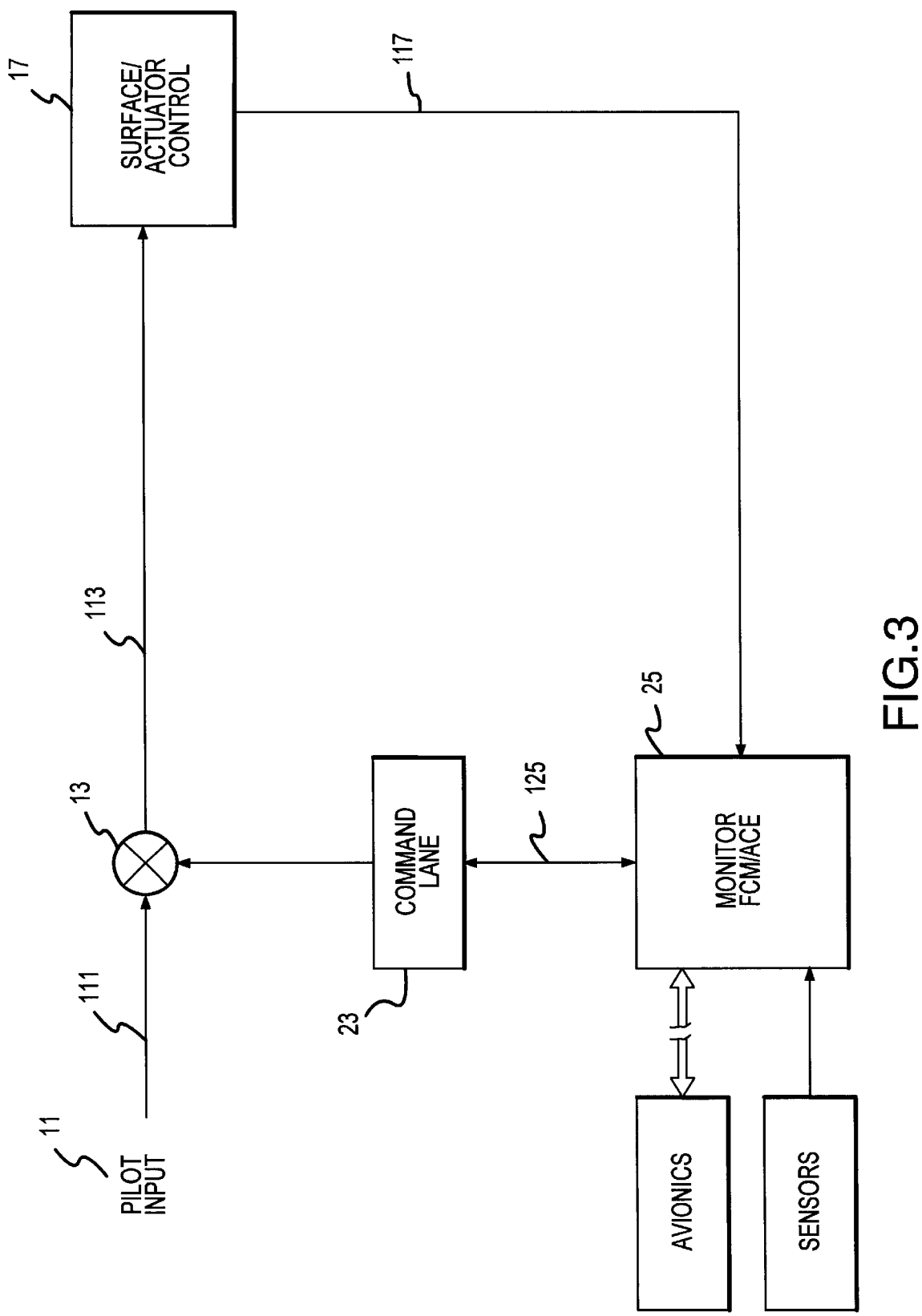
FIG. 3 is a block diagram illustrating a monitor command lane according to another embodiment of the present invention.

In another embodiment as illustrated in FIG. 3, the present invention includes a monitor FCM/ACE circuit 21 in communication with the surface/actuator control circuit 25 and the command lane 23. In this embodiment, the output 117 of the surface actuator control circuitry 17 is transmitted to monitor FCM/ACE 25 to provide additional redundancy if necessary. Monitor FCM/ACE also communicates with avionics and sensors, and further communicates with command lane 23. In this fashion, should any operational instability be detected by monitor FCM/ACE 25 it can communicate with the command lane 23 to either notify the command lane 23 of a potential problem or to control and disengage the command lane 23 from further augmenting the pilot input signal 111. Again, those of skill in the art will now appreciate that the monitor FCM/ACE 25 never affects the pilot command to surface control, and thus, can never cause problems with the aircraft's primary stick to surface control command lane.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a method for providing command augmentation to a command lane within a vehicle, is followed.

What is claimed is:

1. A method for providing command augmentation to a pilot command lane within a vehicle comprising the steps of:
   a) transmitting a pilot's input command to a first summer and a surface actuator control circuitry;
   b) transmitting the first summer output signal to a second summer circuit to modify the first summer output signal with a flight control signal from a flight control computer/actuator control electronics (FCM/ACE) circuit resulting in a second summer output signal; and
   c) transmitting the second summer output signal to the first summer to modify the second summer output signal with the pilot command input signal, the steps identified collectively as a command lane.

2. The method of claim 1 further including the step of introducing a limiting means in communication with the FCM/ACE circuit and the second summer circuit.

3. The method of claim 2 wherein the limiting means limits rate, gain, airspeed, phase margin, aircraft roll, aircraft yaw, aircraft pitch, speed break, column position data and avionic limits required for safe operation of the vehicle.

4. The method of claim 3, the surface actuator control circuitry having an actuator output signal, and further comprising the step of transmitting the actuator output signal to a monitor flight control computer/actuator control electronics (FCM/ACE) circuit resulting in a FCM/ACE signal.

5. The method of claim 4 further comprising the step of allowing the FCM/ACE circuit to communicate with and control the command lane.

6. A method of providing an augmented signal to a pilot's input command signal in a vehicle to assist control the vehicle comprising the steps of:
   transmitting a pilot's input command to a first electronic circuit resulting in a first electronic signal;
   transmitting the first electronic signal to a surface actuator control circuitry and a second electronic circuit;
   allowing the second electronic circuit to modify the first electronic signal by introducing a flight control signal from a flight control computer/actuator control electronics (FCM/ACE) circuit to the first electronic signal resulting in a second electronic signal; and
   transmitting the second electronic signal to the first electronic circuit to modify the second electronic signal with the pilot input command signal, the steps identified collectively as a command lane.

7. The method of claim 6 further comprising the step of introducing a limiting means in communication with the FCM/ACE circuit and the second electronic circuit.

8. The method of claim 7 wherein the limiting means limits rate, gain, airspeed, phase margin, aircraft roll, aircraft yaw, aircraft pitch, speed break, column position data and avionic limits required for safe operation of the vehicle.

9. The method of claim 8, the surface actuator control circuitry having an actuator output signal, and further comprising the step of transmitting the actuator output signal to a monitor flight control computer/actuator control electronics (monitor FCM/ACE) circuit resulting in a monitor FCM/ACE signal.

10. The method of claim 9 further comprising the step of allowing the monitor FCM/ACE to communicate with and control the command lane.

11. A method of providing a modifying signal to a pilot's input command signal in an aircraft comprising the steps of:
    transmitting a pilot's input command to a first circuit resulting in a first signal;
    transmitting the first signal to an actuator control circuit and a second circuit;
    allowing the second circuit to modify the first signal by introducing a flight control signal from a flight control computer/actuator control electronics (FCM/ACE) circuit to the first signal resulting in a second signal;
    transmitting the second signal to the first circuit; and
    modifying the second signal with the pilot input command signal, the steps identified collectively as a command lane.

12. The method of claim 11 wherein the step of modifying the second signal further comprises the step of adding the second signal to the pilot input command signal.

13. The method of claim 11 wherein the step of modifying the second signal further comprises the step of subtracting the second signal from the pilot input command signal.

14. The method of claim 11 further comprising the step of introducing a limiting means in communication with the FCM/ACE circuit and the second circuit.

15. The method of claim 14 wherein the limiting means limits rate, gain, airspeed, phase margin, aircraft roll, aircraft yaw, aircraft pitch, speed break, column position data and avionic limits required for safe operation of the aircraft.

16. The method of claim 15, the surface actuator control circuitry having an actuator output signal, and further comprising the step of transmitting the actuator output signal to a monitor flight control computer/actuator control electronics (FCM/ACE) circuit resulting in a monitor FCM/ACE signal.

17. The method of claim 16 further comprising the step of allowing the monitor FCM/ACE to communicate with and control the command lane.

* * * * *